(12) United States Patent
Rhodes et al.

(10) Patent No.: US 8,704,620 B2
(45) Date of Patent: Apr. 22, 2014

(54) LINEAR ACTUATOR

(75) Inventors: John David Rhodes, Menston (GB); Christopher Ian Mobbs, Menston (GB); Andrew James Panks, Leeds (GB)

(73) Assignee: Filtronic Wireless Ltd, Shipley (GB)

( * ) Notice: Subject to any disclaimer, the term of this patent is extended or adjusted under 35 U.S.C. 154(b) by 564 days.

(21) Appl. No.: 12/937,329

(22) PCT Filed: Apr. 9, 2009

(86) PCT No.: PCT/GB2009/000940
§ 371 (c)(1),
(2), (4) Date: Jan. 21, 2011

(87) PCT Pub. No.: WO2009/125195
PCT Pub. Date: Oct. 15, 2009

(65) Prior Publication Data
US 2011/0115577 A1    May 19, 2011

(30) Foreign Application Priority Data
Apr. 9, 2008 (GB) .................................. 0806391.9

(51) Int. Cl.
*H01P 7/06* (2006.01)
*F16H 1/32* (2006.01)
*F16B 37/00* (2006.01)

(52) U.S. Cl.
USPC ........................... 333/232; 74/424.71; 411/55

(58) Field of Classification Search
USPC ......... 74/424.5, 424.71, 424.75, 424.76, 440, 74/441, 89.42, 89.23, 462, 409; 333/221–224, 226, 232; 411/44–71
See application file for complete search history.

(56) References Cited

U.S. PATENT DOCUMENTS 2,361,814 A * 10/1944 Berry ........................... 411/270
2,659,241 A    11/1953 Holman
(Continued)

FOREIGN PATENT DOCUMENTS

DE    34 21 273 A1    12/1984
EP    1391963 A1 *    2/2004
(Continued)

OTHER PUBLICATIONS

International Search Report for WO 2009/125195 A1 dated Jun. 9, 2009 (3 pages).

(Continued)

*Primary Examiner* — Benny Lee
*Assistant Examiner* — Rakesh Patel
(74) *Attorney, Agent, or Firm* — Howard & Howard Attorneys PLLC (57) ABSTRACT

A linear actuator includes a drive arm and an extension arm each extending along a common drive axis. One of the arms has a plurality of resiliently deformable fingers extending beyond the end of the arm towards the other arm. At least one of the fingers has a thread on its inner face while the other arm has a threaded portion. At least part of the threaded portion is received between the fingers. The fingers are adapted to urge the threads of the two arms into interengagement such that rotation of the drive arm about the drive axis displaces the extension arm along the drive axis. The two threads are arranged such that when the ridge of one thread is received in the groove of the other thread the two sides of the ridge abut the two edges of the mouth of the groove.

32 Claims, 8 Drawing Sheets

(56) References Cited

U.S. PATENT DOCUMENTS

| | | |
|---|---|---|
| 3,656,358 A | 4/1972 | Kopp |
| 3,975,968 A | 8/1976 | Chaffin |
| 4,633,732 A | 1/1987 | Nishikawa et al. |
| 4,730,174 A * | 3/1988 | Nishikawa et al. ........... 333/224 |
| 4,753,122 A | 6/1988 | Nishikawa et al. |
| 5,027,671 A | 7/1991 | Erikson et al. |

FOREIGN PATENT DOCUMENTS

| | | |
|---|---|---|
| JP | 57094158 | 11/1980 |
| WO | 98/39581 | 9/1998 |
| WO | 2009067523 A1 | 5/2009 |

OTHER PUBLICATIONS

International Preliminary Report on Patentability for WO 2009/125195 A1 dated Oct. 12, 2010 (7 pages).

Great Britain International Search Report, GB0806391.9, Aug. 5, 2009, 2 pages.

\* cited by examiner

LINEAR ACTUATOR

CROSS REFERENCE TO RELATED APPLICATIONS

This application claims priority to and all the advantages of International Application No. PCT/GB2009/000940, filed on Apr. 9, 2009, which claims priority to Great Britain Patent Application No. 0806391.9, filed on Apr. 9, 2008.

BACKGROUND OF THE INVENTION

1. Field of the Invention

The present invention relates to a linear actuator. More particularly, but not exclusively, the present invention relates to a linear actuator having a drive arm and an extension arm which are interengaged by threads the ridge of one thread abutting both sides of the corresponding groove of the other thread.

2. Description of the Related Art

Linear actuators which convert rotary motion into linear motion are known. Simple linear actuators wherein the components are coupled together by threads tend to suffer from a degree of backlash. In some applications, for example where the linear actuator is being used to position a tuning member in a microwave resonant cavity, the uncertainty in position in the end of the actuator arm due to this backlash can be a significant effect. Linear actuators which compensate for the effects of backlash are also known. Such actuators however tend to be complex and expensive devices including optical or electrical feedback circuits.

SUMMARY OF THE INVENTION

The linear actuator according to the invention seeks to overcome the problems of the prior art.

Accordingly, the present invention provides a linear actuator comprising
  a drive arm and an extension arm each extending along a common drive axis;
  the extension arm being at least partially received in a housing, the housing allowing displacement of the extension arm along the drive axis but preventing rotation of the extension arm around the drive axis;
  one of the arms having a plurality of resiliently deformable fingers extending beyond the end of the arm towards the other arm, at least one of the fingers having a thread on its inner face;
  the other arm having a threaded portion, at least part of the threaded portion being received between the fingers;
  the fingers being arranged to urge the threads of the two arms into interengagement such that rotation of the drive arm about the drive axis displaces the extension arm along the drive axis;
  characterised in that
  the two threads are arranged such that when the ridge of one thread is received in the groove of the other thread the two sides of the ridge abut the two edges of the mouth of the groove.

The linear actuator according to the invention is a simple mechanical device but does not suffer from backlash. The device is therefore suitable for use in applications where backlash can have a significant effect on the application. In addition, the linear actuator according to the invention is a simple mechanical device which is inexpensive to manufacture and reliable.

Preferably, the angle between the ridge faces at the points of abutment is larger than the angle between the groove faces at the points of abutment.

Preferably, both threads comprise V shaped ridges and grooves, the ridge angle of one thread being larger than the ridge angle of the other thread.

Preferably, the linear actuator comprises at least three, preferably four, fingers.

Preferably, the fingers are equally spaced around the drive axis.

Preferably, the two arms are dimensioned such that the fingers are deformed outwards away from the drive axis so urging the two threads together.

Preferably, the fingers urge the two threads together in a direction substantially normal to the drive axis.

Preferably, the fingers extend substantially parallel to the drive axis.

Preferably, the fingers are adapted to be deformed independently of each other.

The housing can comprise a slot extending substantially parallel to the drive axis and a protrusion extends from the side of the extension arm and is received in the slot.

Alternatively, the housing can comprise a housing body and a plurality of resiliently deformable gripping fingers extending from the housing body and gripping the extension arm therebetween, the gripping fingers holding the extension arm in an equilibrium orientation relative to the drive axis; the cross section of the extension arm normal to the drive axis at the point of gripping being non circular and arranged such that as a rotational force is applied to the extension arm about the drive axis the gripping fingers oppose the rotational motion of the extension arm.

Preferably, the cross section of the extension arm at the point of gripping is either an n sided polygon with n greater than or equal to three, preferably triangular, square or rectangular.

Preferably, the gripping fingers are adapted such that the force applied to the extension arm by the gripping fingers is normal to the drive axis.

The gripping fingers can each comprise a shaft substantially parallel to the drive axis and 30 a head extending from the shaft which abuts the extension arm.

Preferably, the gripping fingers are deformed outwards by the extension arm when the extension arm is in the equilibrium position.

Preferably, the linear actuator comprises at least three, preferably four gripping fingers.

The gripping fingers can be equally spaced around the drive axis.

Preferably, the gripping fingers are adapted to be deformed independently of each other.

The housing can comprise a housing body and a plurality of holding fingers extending from the body to grip the drive arm therebetween, the ends of the holding fingers having camming surfaces which are engaged with a corresponding camming surface extending at least partially around the drive arm.

Preferably, one camming surface is a ridge and the other camming surface is a groove.

Preferably, the two sides of the ridge abut the two edges of the mouth of the groove.

Preferably, each of the extension arm and the drive arm has a plurality of end stops extending from the arm, the end stops being arranged in pairs on opposite sides of the drive axis, the extension arm end stops being arranged to rotate into abutment with the drive arm end stops as the extension arm reaches an end of its range of travel.

Preferably, the linear actuator comprises at least three, preferably four holding fingers.

The holding fingers can be equally spaced about the drive axis.

Preferably, the holding fingers are adapted to be deformed independently of each other.

In a further aspect of the invention there is provided a linear actuator comprising a drive arm and an extension arm extending along a common drive axis;

- the extension arm being at least partially received in a housing, the housing allowing displacement of the extension arm along the drive axis but preventing rotation of the extension arm about the drive axis;
- the extension arm and drive arm being coupled together such that rotation of the drive arm about the drive axis displaces the extension arm along the drive axis;
- the housing comprising a housing body and a plurality of resiliently deformable holding fingers extending from the housing body and gripping the drive arm therebetween, at least one holding finger having a camming surface which is urged into interengagement by its holding finger with a camming surface extending at least partially around the drive arm;
- one of the camming surfaces being a groove and the other camming surface being a ridge;
- characterised in that
- the ridge and groove are adapted such that the two sides of the ridge abut the two edges of the mouth of the groove.

Preferably, the angle between the ridge faces at the points of abutment is greater than the angle between the groove faces at the points of abutment.

Preferably, both ridge and groove are V shaped, the ridge angle being wider than the groove angle.

Preferably, the linear actuator comprises at least three holding fingers, preferably four holding fingers.

Preferably, the fingers are equally spaced about the drive axis.

Preferably, the gripping force applied by the holding fingers to the drive arm is substantially normal to the drive axis.

Preferably, the holding fingers are adapted to be deformed independently of each other.

In a further aspect of the invention there is provided a tunable microwave resonator comprising a microwave resonant cavity; and, a linear actuator;

the linear actuator further comprising a tuning member, the linear actuator being arranged such that rotation of the drive arm displaces the tuning member within the cavity.

The tuning member can be a metal.

The tuning member can be a dielectric.

BRIEF DESCRIPTION OF THE DRAWINGS

The present invention will now be described by way of example only and not in any limitative sense with reference to the drawings in which.

DETAILED DESCRIPTION OF THE EXEMPLARY EMBODIMENT

Figure 1:
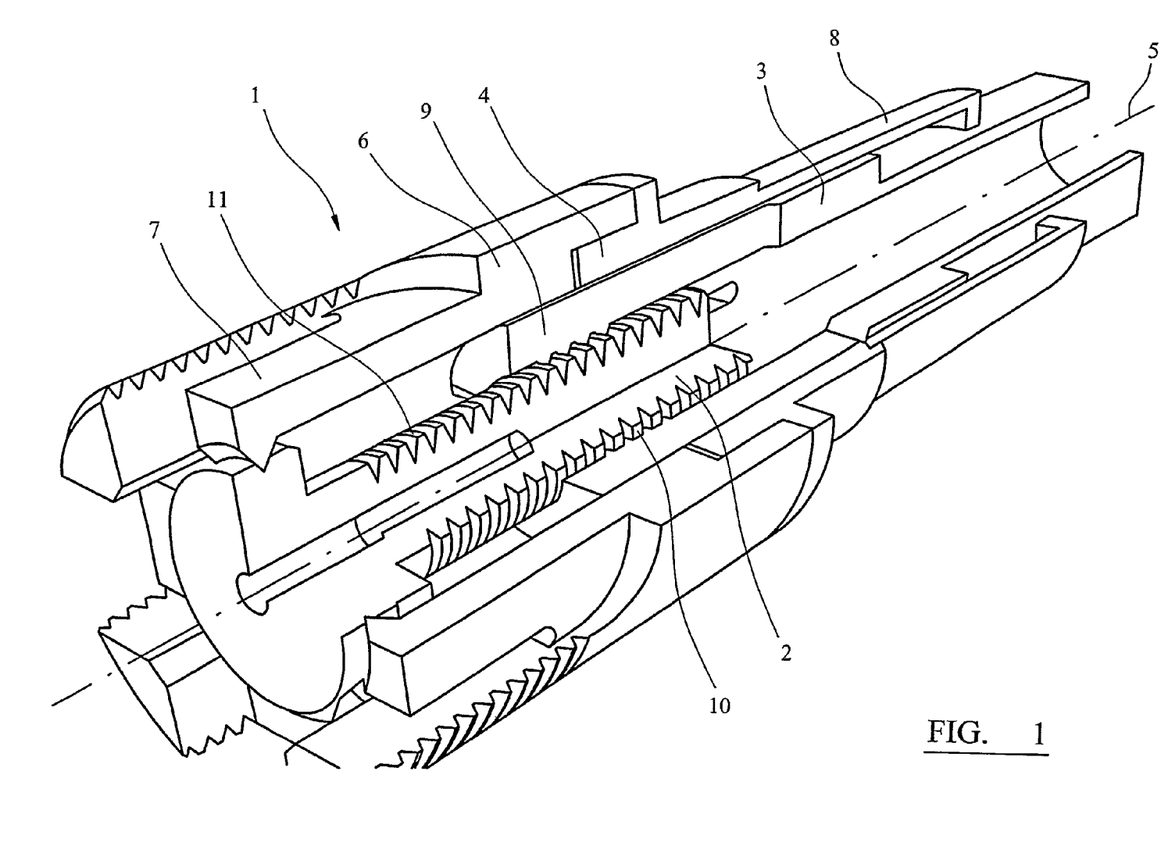
FIG. 1 shows a linear actuator according to the invention in cut away perspective view from the drive arm end.

Shown in FIG. 1 is a linear actuator 1 according to the invention. The linear actuator 1 comprises a drive arm 2 and an extension arm 3 both partially received within a housing 4. The drive arm 2 and extension arm 3 both extend along a common drive axis 5.

The housing 4 comprises a housing body 6. A plurality of holding fingers 7 extend from the housing body 6 and grip the drive arm 2 therebetween. The holding fingers 7 constrain the drive arm 2 such that it is free to rotate about the drive axis 5 but cannot be displaced along the drive axis 5. The holding fingers 7 are described in more detail below. Similarly, a plurality of gripping fingers 8 extend from the housing body 6 and grip the extension arm 3 therebetween. The gripping fingers 8 constrain the extension arm 3 such that it is free to be displaced along the drive axis 5 but resist rotation of the extension arm 3 about the drive axis 5. Again the gripping fingers 8 are described in more detail below.

The end of the extension arm 3 is split into a plurality of independent resiliently deformable fingers 9 which extend beyond the end of the arm 3 towards the drive arm 2. In this embodiment the fingers 9 are substantially parallel to the drive axis 5. A thread 10 is arranged on the inner faces of the fingers 9.

The drive arm 2 has a threaded portion 11 on its outer face. The threaded portion 11 of the drive arm 2 is received within the fingers 9 such that the two threads 10,11 interengage. The drive arm 2 is dimensioned such that the fingers 9 are deformed outwardly away from the drive axis 5. The fingers 9 therefore urge the two threads 10,11 into interengagement. The fingers 9 are adapted such that the force applied by the fingers 9 urging the two threads 10,11 together is substantially normal to the drive axis 5.

Because of the threaded engagement between the drive arm 2 and the extension arm 3 rotation of the drive arm 2 about the drive axis 5 displaces the extension arm 3 along the drive axis 5.

Figure 2A:
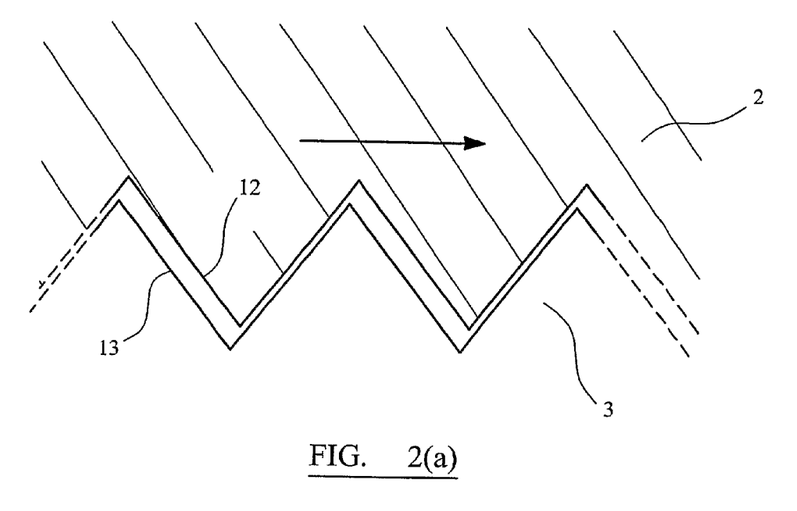
FIGS. 2(a) and 2(b) show an extension arm and a drive arm engaged by known threads.
Figure 2B:
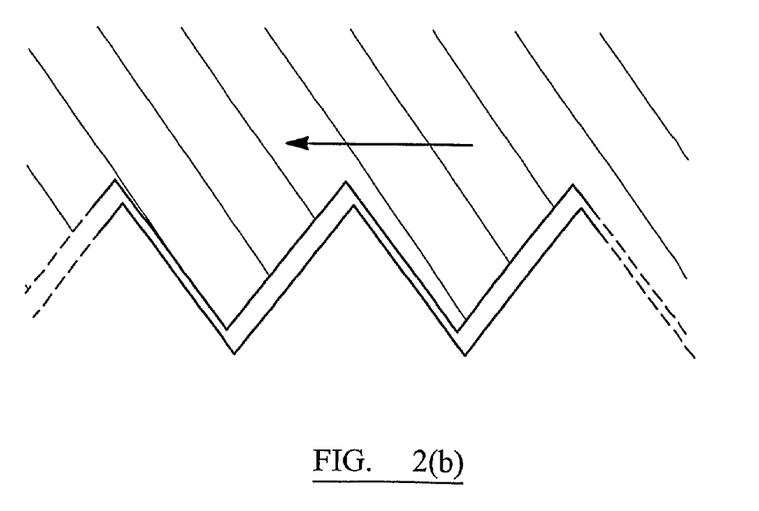

FIGS. 2(a) and 2(b) show in cross section a drive arm 2 and extension arm 3 interengaged by two standard threads 12,13. The ridges of one thread 12 do not fit exactly within the grooves of the other thread 13. Accordingly, when the drive arm thread 12 is being rotated in a first direction (FIG. 2(a)) the ridges of the drive arm thread 12 abut the right hand wall of the extension arm groove pushing the extension arm 3 to the right along the drive axis 5. When the direction of rotation of the drive arm 2 is reversed the drive arm thread 12 shifts position slightly with respect to the extension arm thread 13 so that it abuts the left hand groove wall of the extension arm thread 13 (FIG. 2(b)). The drive arm thread 12 then drives the extension arm 3 to the left along the drive axis 5. This slight shift in position before the threads 12,13 engage causes backlash.

The design of the two threads 10,11 of the linear actuator 1 according to the invention prevents backlash when the direction of rotation of the drive arm 2 is reversed. One embodiment of the threads 10,11 is shown in cross section in FIG. 3. Each thread 10,11 can be arranged on either drive arm 2 or extension arm 3.

Figure 3:
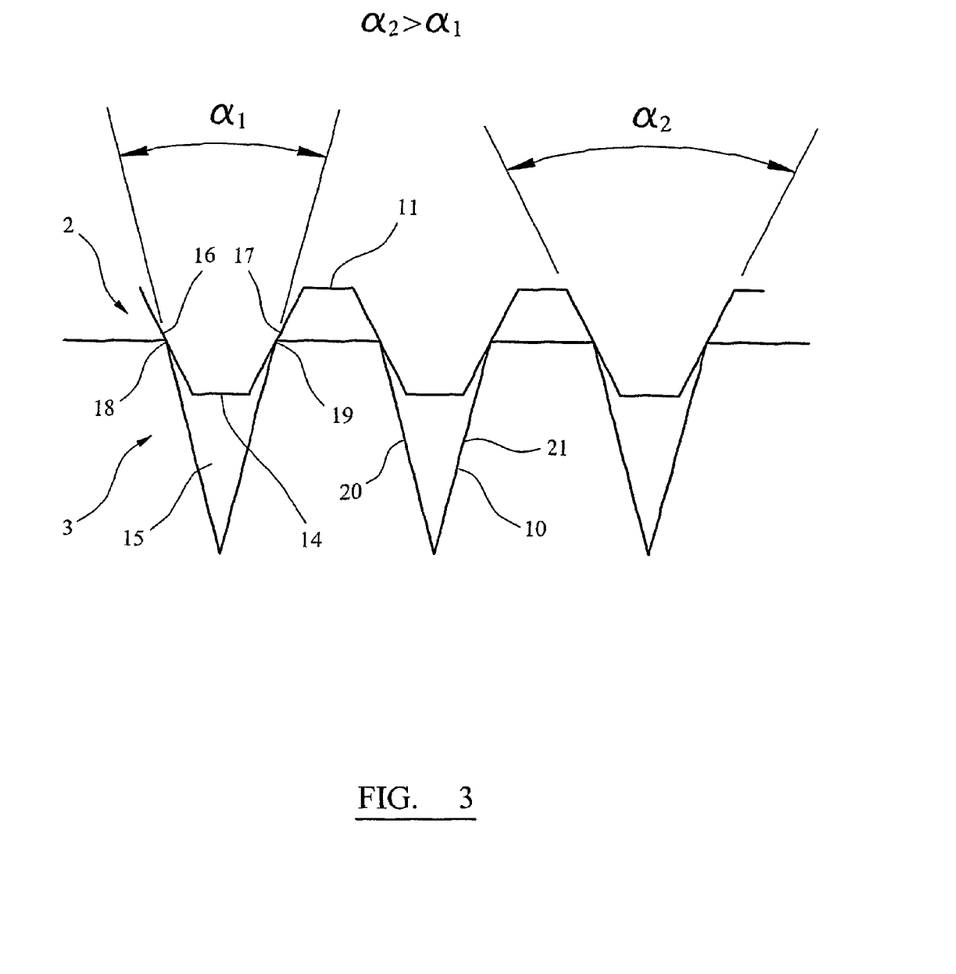
FIG. 3 shows threaded engagement between the drive arm and extension arm of a linear actuator according to the invention.

As can be seen, as the ridge 14 of one thread 11 is urged into the groove 15 of the other thread 10 by the fingers 9 each of the two sides 16,17 of the ridge 14 abuts a corresponding edge 18,19 of the mouth of groove 15. The angle between the ridge faces 16,17 at the points of abutment is greater than the angle between the groove faces 20,21 at the point of abutment. Because the ridge 14 is in contact with both edges 18,19 of the mouth of the receiving groove 15 there is no change in relative position of drive arm thread 11 and extension arm thread 10 when the direction of rotation of the drive arm 2 is changed. Backlash is therefore eliminated.

An important consideration is wear on the threads during use. With known threads, as the ridges are worn. away the ridge of one thread becomes an increasingly poor fit in the groove of the other. The degree of backlash therefore increases. With the threads 10,11 according to the invention the ridge 14 of one thread 11 will always abut both sides 20,21 of the groove 15 of the other even as the threads 10,11 are worn away because of the fingers 9 urging the threads 10,11 into interengagement. This maintains zero backlash.

A further important feature of the threads 10,11 of the linear actuator 1 according to the invention is that the ridge 14 of one thread 11 contacts the mouth of the groove 15 along lines at the edges 18,19 of the mouth, rather than over an extended area as with known threads. Rotation of the drive arm 2 therefore mainly imparts a force along the drive axis 5 to the extension arm 3 and only imparts a very minimal rotational force to the extension arm 3 around the drive axis 5. The importance of this is described in more detail below.

Figure 4:
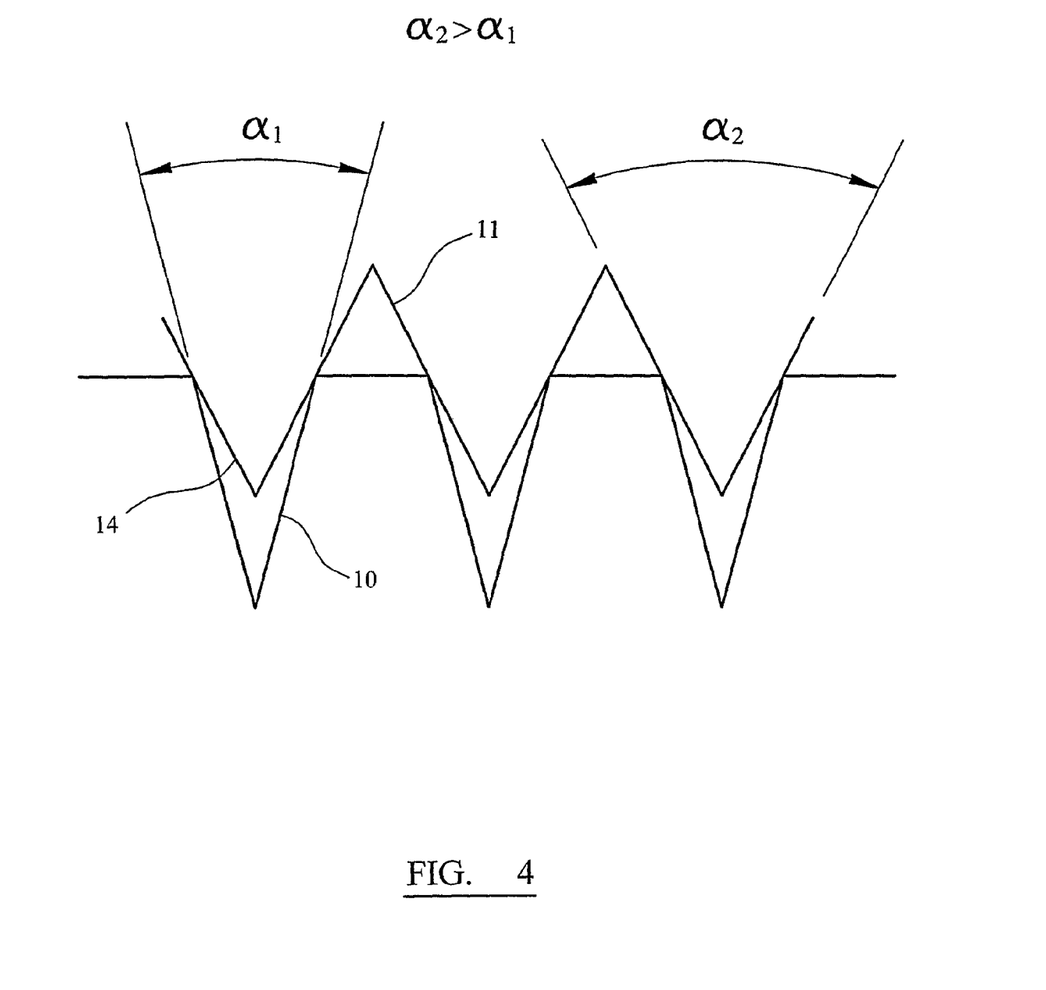
FIG. 4 shows threaded engagement between the drive arm and extension arm of a 5 further embodiment of a linear actuator according to the invention.

Shown in FIG. 4 is a further embodiment of the threads 10,11 of a linear actuator 1 according to the invention shown in cross section. In this embodiment both threads 10,11 have V shaped ridges 14 and grooves 15. The ridge angle of one thread 11 (i.e. the angle between ridge faces 16,17 at the point of contact of the two) is wider than the groove angle (i.e. the angle between the groove faces 20,21 at the point of contact of the two) of the other thread 10 so ensuring that the ridge 14 abuts both sides 20,21 of the mouth of the groove 15.

Figure 5:
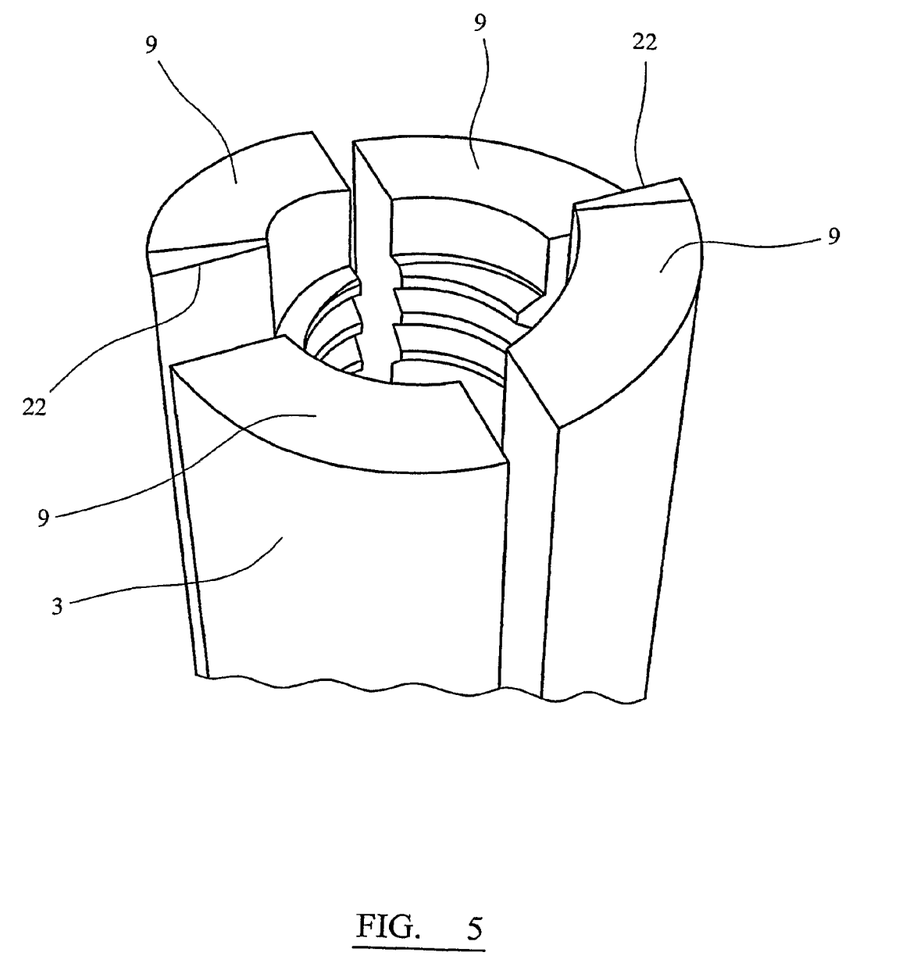
FIG. 5 shows the end of an extension arm of a linear actuator according to the invention.

Shown in FIG. 5 are the fingers 9 extending beyond the end of the extension arm 3. In this embodiment the extension arm 3 comprises four fingers 9 which are equally spaced about the drive axis 5. In alternative embodiments different numbers of fingers 9 are possible. In an alternative embodiment (not shown) the end comprises three fingers 9 equally spaced about the drive axis 5. In this embodiment two of the fingers 9 of the extension arm 3 extend beyond the others to form end stops 22. The end stops 22 are on opposite sides of the drive axis 5.

Figure 6:
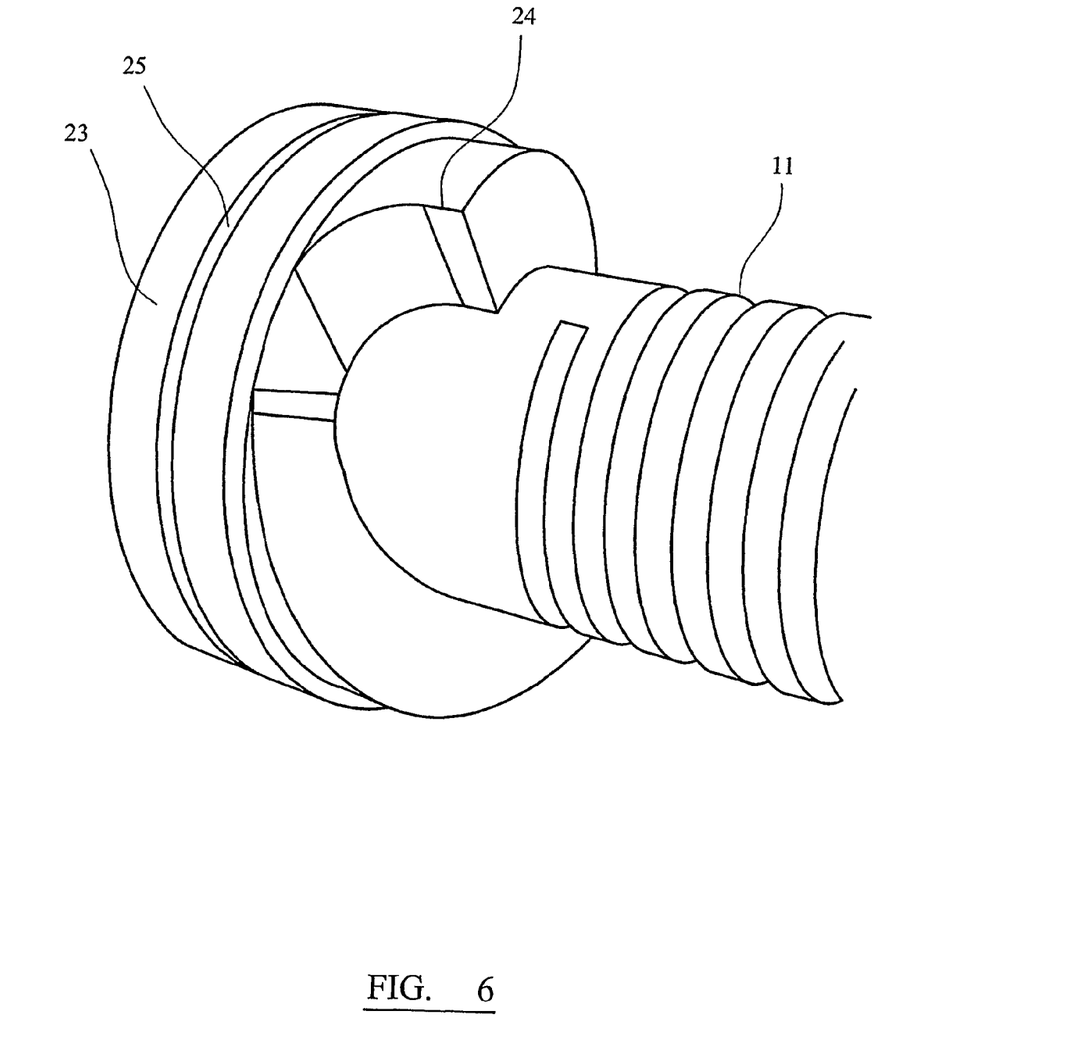
FIG. 6 shows the end of a drive arm of a linear actuator according to the invention.

FIG. 6 shows the end of the drive arm 2 remote from the extension arm 3. The drive arm 2 comprises a threaded shaft portion 11 and a head portion 23. Extending from the head portion 23 parallel to the drive axis 5 are two end stops 24. Again the end stops 24 are arranged on opposite sides of the drive axis 5. As the drive arm 2 is rotated about the drive axis 5 the extension arm 3 travels along the drive arm. 2 towards the drive arm head portion 23. As the extension arm 3 reaches an end of its range of motion the extension arm end stops 22 rotate into abutment with the drive arm end stops 24 preventing further rotation of the drive arm 2 and travel of the extension arm 3. Because the end stops 22,24 are arranged in pairs, the abutment does not produce an overall lateral force on the extension arm 3 normal to the drive axis 5 so preventing displacement of the extension arm 3 to one side. In embodiments with an odd number of fingers 9 the end stops 22,24 are arranged such that as the fingers 9 rotate into abutment no overall lateral force is provided to the extension arm 3.

As can be seen in FIG. 6, the head portion 23 of the drive arm 2 includes a groove 25 extending around the drive arm 2. The function of this groove 25 is best explained with reference to FIG. 7 which shows the end of the drive arm 2 received within the housing 4. As mentioned above, resiliently deformable holding fingers 7 extend from the housing body 6 to the drive arm 2 and grip the head portion 23 therebetween. At the end of each arm 7 is a camming surface 26 (in this embodiment a ridge) which engages with a corresponding camming surface 27 of the head portion 23 (in this embodiment the groove). The ridge angle of the ridge 26 is wider than the groove angle of the groove 27 such that each side of the ridge 26 abuts a corresponding edge of the mouth of the groove 27. The drive arm 2 is therefore prevented from being displaced along the drive axis 5 but is free to rotate about the drive axis 5. Because the ridge 26 and groove 27 contact each other along lines along the edges of the mouth of the groove 27 there is very little friction opposing rotation of the drive arm 2.

Figure 7:
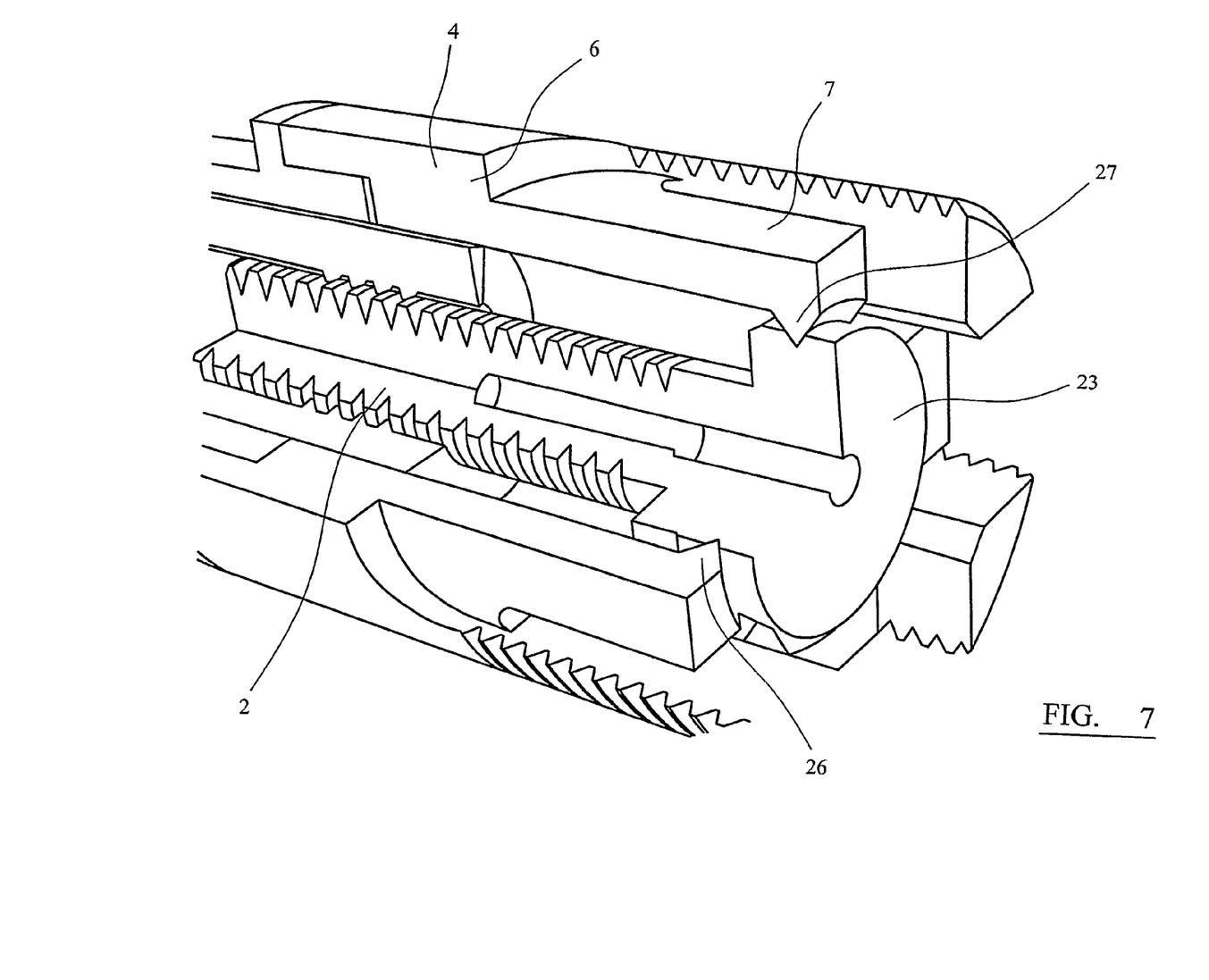
FIG. 7 shows the drive arm and housing portions of a linear actuator according to the invention; and, FIG. 8 shows a linear actuator according to the invention in cut away perspective view from the extension arm end.

In this embodiment the holding fingers 7 extend substantially parallel to the drive axis 5. The head portion 23 of the drive arm 2 bends the fingers 7 outwards so that the fingers 7 urge the ridge 26 into the groove 27. The urging force is substantially normal to the drive axis 5.

In an alternative embodiment of the invention the camming surface 27 of the drive arm 2 comprises a ridge and the camming surface 26 of the holding fingers 7 comprises a groove. The holding fingers 7 are adapted such that they can each be deformed independently of each other.

Figure 8:
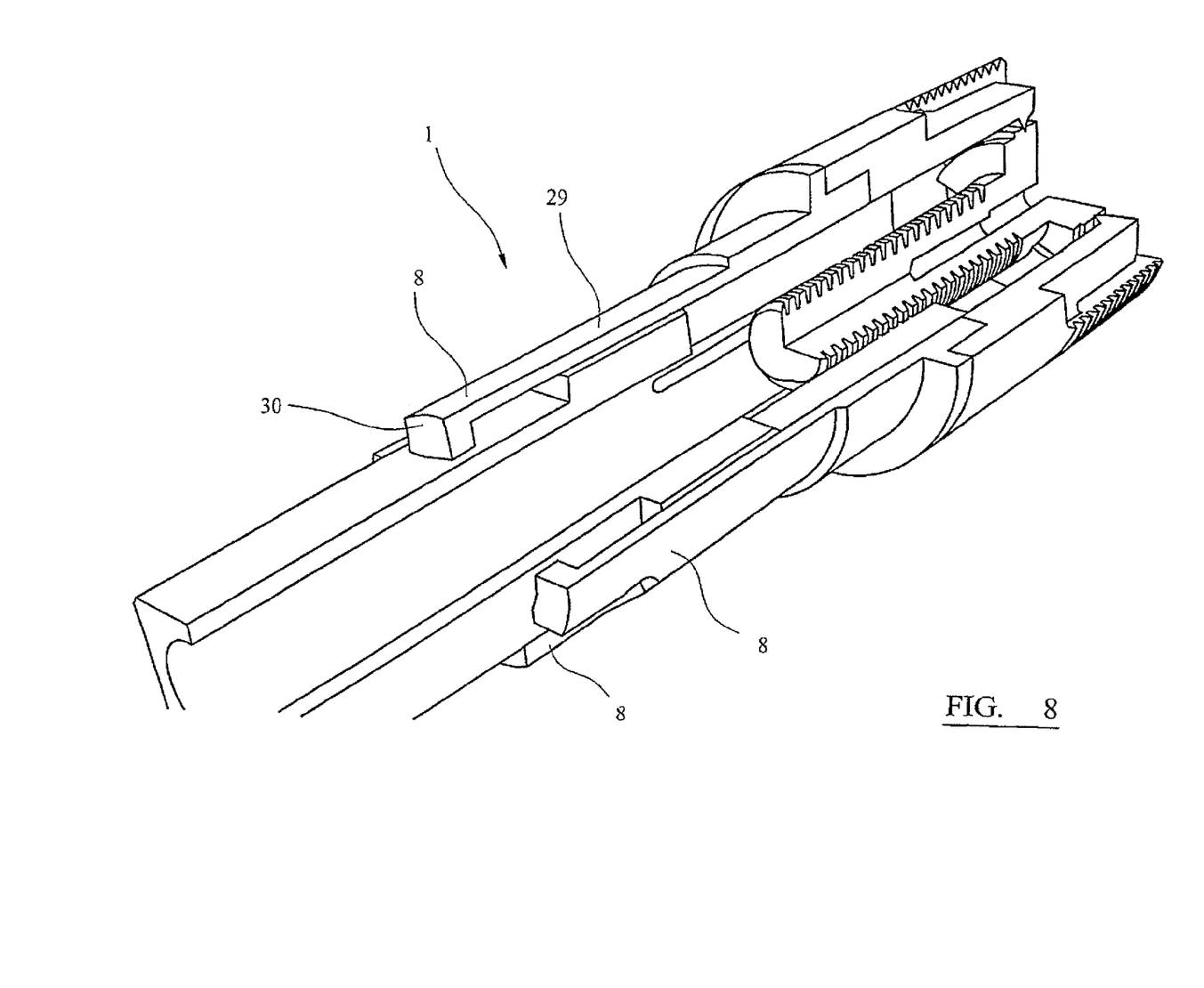

FIG. 8 shows the linear actuator 1 from the opposite end in cut away section. A plurality of gripping fingers 8 (in this case four fingers) extend from the housing body 6 and grip the extension arm 3 therebetween. The extension arm 3 of this embodiment is square in cross section at the point of gripping. The gripping fingers 8 each comprise a shaft 29 which extends substantially parallel to the drive axis 5. Each gripping finger 8 has a gripping head 30 which abuts the extension arm 3 and extends substantially normal to the drive axis 5. The extension arm 3 is dimensioned such that the gripping fingers 8 are bent outwards away from the drive axis 5 so urging the gripping heads 30 into abutment with the extension arm 3. The urging force is substantially normal to the drive axis 5.

Without any force applied to the extension arm 3 the gripping fingers 8 hold the extension arm 3 in an equilibrium orientation relative to the drive axis 5 as shown. If a rotational force is applied to the extension arm 3 about the drive axis 5 the gripping fingers 8 oppose rotation of the extension arm 3. This is because of the shape of the extension arm 3. As the extension arm 3 attempts to rotate; the extension arm 3 urges the gripping fingers 8 outwardly away from the drive axis 5. The gripping fingers 8 provide a restoring force returning the extension arm 3 to its equilibrium position.

If the rotational force is too great there is a danger the extension arm 3 will move from one equilibrium position to the next (in this case rotating by 90 degrees about the drive axis 5). As previously mentioned however the threads 10,11 which interengage the drive arm 2 and extension arm 3 are adapted such that the ridge of one abuts the mouth of the groove of the other along lines at the edge of the mouth. Rotating the drive arm 2 therefore produces relatively little turning force on the extension arm 3 about the drive axis 5 so preventing this from happening.

Other shapes of cross section of the extension arm 3 are possible. Most generally the cross section of the extension arm 3 at the point of gripping is non circular. The cross section of the extension arm 3 can be an n sided polygon with n greater than three, preferably triangular, rectangular or square. The housing 4 will have a corresponding number of gripping fingers 8, one for each side of the polygon. Preferably the gripping fingers 8 are equally spaced about the drive axis 5.

The gripping fingers 8 are adapted such that each gripping finger 8 can be resiliently deformed independently of the others.

A further advantage of the linear actuator 1 according to the invention is that both the drive arm 2 and extension arm 3 are suspended by fingers 7,8 extending from the housing body 6. Neither the drive arm 2 nor the extension arm 3 is rigidly fixed to the housing 4 at any point. The independently deformable fingers 7,8 allows for a small substantially conical displacement of the extension arm 3 relative to the drive axis 5. Similarly, the independently deformable gripping fingers 8 allow for a conical displacement of the extension arm 3 about the drive axis 5 relative to the housing. The drive arm 2 and the 30 extension arm 3 can therefore be slightly misaligned during use without the linear actuator 1 jamming. In known linear actuators if the drive arm urged out of alignment with the extension arm during use the actuator will jam.

In a further embodiment of the invention (not shown) the housing 4 comprises a slot. A 5 protrusion extends from the side of the extension arm 3 and is received in the slot so preventing rotation of the extension arm 3 about the drive axis 5.

A typical application of such a linear actuator 1 is in the tuning of microwave resonators. The linear actuator 1 displaces a tuning member within a microwave resonant cavity to tune the microwave resonant cavity. The tuning member can be a metal. The tuning member can be a dielectric. Typically the linear actuator 1 is arranged outside the cavity with the extension arm 3 extending into the cavity via an aperture in the cavity wall. When used in such applications the actuator 1 is manufactured from one or more plastics materials.

In the above embodiments the end of the extension arm 3 is split into fingers 8 which grip the drive arm 2. In alternative embodiments the drive arm 2 grips the extension arm 3.

The invention claimed is:

1. A linear actuator comprising:
   a drive arm and an extension arm each extending along a common drive axis;
   the extension arm being at least partially received in a housing, the housing allowing displacement of the extension arm along the common drive axis but preventing rotation of the extension arm around the common drive axis;
   one of the arms having a plurality of resiliently deformable fingers extending beyond the end of the one of the arms towards the other one of the arms, at least one of the plurality of fingers having a thread on an inner face thereof;
   the other arm having a thread, at least part of the thread being received between the plurality of fingers;
   the thread of each of the arms including a ridge defined between two edges and a groove defined by sides extending from the two edges;
   the plurality of fingers being adapted to urge the thread of each of the arms into interengagement such that rotation of the drive arm about the common drive axis displaces the extension arm along the common drive axis;
   wherein the thread of each of the arms is arranged such that when the ridge of one thread is received in the groove of the other thread, the sides of the one thread abut the two edges of a mouth of the groove of the other thread; and
   wherein the angle between faces of the ridges at the points of abutment is larger than the angle between faces of the groove at the points of abutment.

2. A linear actuator as claimed in claim 1, wherein each of the extension arm and the drive arm has a plurality of end stops extending from the corresponding arm, the plurality of end stops being arranged in pairs on opposite sides of the common drive axis, the plurality of end stops of the extension arm being arranged to rotate into abutment with the plurality of end stops of the drive arm as the extension arm reaches an end of a range of travel.

3. A linear actuator as claimed in claim 1, wherein the thread of each of the arms comprises V shaped ridges and grooves, the ridge angle of one thread being larger than the ridge angle of the other thread.

4. A linear actuator as claimed in claim 1, wherein the plurality of resiliently deformable fingers is further defined as four resiliently deformable fingers.

5. A linear actuator as claimed in claim 1, wherein the plurality of fingers are equally spaced around the common drive axis.

6. A linear actuator as claimed in claim 1, wherein the arms are dimensioned such that the plurality of fingers are deformed outwards away from the common drive axis to urge the thread of each of the arms together.

7. A linear actuator as claimed in claim 6, wherein the plurality of fingers urge the thread of each of the arms together in a direction substantially normal to the common drive axis.

8. A linear actuator as claimed in claim 1, wherein the plurality of fingers extend substantially parallel to the common drive axis.

9. A linear actuator as claimed in claim 1, wherein the plurality of fingers are adapted to be deformed independently of each other.

10. A linear actuator as claimed in claim 1, wherein the housing comprises a slot extending substantially parallel to the common drive axis and a protrusion extends from a side of the extension arm and is received in the slot.

11. A linear actuator as claimed in claim 1, wherein the housing comprises a housing body and a plurality of resiliently deformable gripping fingers extending from the housing body and gripping the extension arm therebetween, the plurality of gripping fingers holding the extension arm in an equilibrium orientation relative to the common drive axis; and
   the cross section of the extension arm normal to the common drive axis at the point of gripping being non-circular and arranged such that as a rotational force is applied to the extension arm about the common drive axis, the plurality of gripping fingers oppose the rotational motion of the extension arm.

12. A linear actuator as claimed in claim 11, wherein the cross section of the extension arm at the point of gripping is an n sided polygon with n greater or equal to three.

13. A linear actuator as claimed in claim 11, wherein the plurality of gripping fingers are adapted such that the force applied to the extension arm by the plurality of gripping fingers is normal to the common drive axis.

14. A linear actuator as claimed in claim 11, wherein the plurality of gripping fingers each comprise a shaft substantially parallel to the common drive axis and a head extending from the shaft which abuts the extension arm.

15. A linear actuator as claimed in claim 11, wherein the plurality of gripping fingers are deformed outwards by the extension arm when the extension arm is in the equilibrium orientation.

16. A linear actuator as claimed in claim 11, wherein the plurality of resiliently deformable gripping fingers is further defined as four resiliently deformable gripping fingers.

17. A linear actuator as claimed in claim 16, wherein the plurality of gripping fingers are equally spaced around the common drive axis.

18. A linear actuator as claimed in claim 11, wherein the plurality of gripping fingers are adapted to be deformed independently of each other.

19. A linear actuator as claimed in claim 1, wherein the housing comprises a housing body and a plurality of holding fingers extending from the housing body to grip the drive arm therebetween, the ends of the plurality of holding fingers having camming surfaces which are engaged with a corresponding camming surface extending at least partially around the drive arm.

20. A linear actuator as claimed in claim 19, wherein one camming surface is a ridge and the other camming surface is a groove.

21. A linear actuator as claimed in claim 19, wherein the plurality of holding fingers are equally spaced about the common drive axis.

22. A linear actuator as claimed in claim 19, wherein the plurality of holding fingers are adapted to be deformed independently of each other.

23. A linear actuator as claimed in claim 19, wherein the plurality of holding fingers is further defined as four holding fingers.

24. A linear actuator comprising:
- a drive arm and an extension arm each extending along a common drive axis;
- the extension arm being at least partially received in a housing, the housing allowing displacement of the extension arm along the common drive axis but preventing rotation of the extension arm around the common drive axis;
- one of the arms having a plurality of resiliently deformable fingers extending beyond the end of the one of the arms towards the other one of the arms, at least one of the plurality of fingers having a thread on an inner face thereof;
- the other arm having a thread, at least part of the thread being received between the plurality of fingers;
- the thread of each of the arms including a ridge defined between two edges and a groove defined by sides extending from the two edges;
- the plurality of fingers being adapted to urge the thread of each of the arms into interengagement such that rotation of the drive arm about the common drive axis displaces the extension arm along the common drive axis;
- wherein the thread of each of the arms is arranged such that when the ridge of one thread is received in the groove of the other thread, the sides of the one thread abut the two edges of a mouth of the groove of the other thread; and
- wherein the housing comprises a housing body and a plurality of holding fingers extending from the housing body to grip the drive arm therebetween, the ends of the plurality of holding fingers having camming surfaces which are engaged with a corresponding camming surface extending at least partially around the drive arm.

25. A linear actuator as claimed in claim 24, wherein one camming surface is a ridge and the other camming surface is a groove.

26. A linear actuator comprising:
- a drive arm and an extension arm extending along a common drive axis;
- the extension arm being at least partially received in a housing, the housing allowing displacement of the extension arm along the common drive axis but preventing rotation of the extension arm about the common drive axis;
- the extension arm and drive arm being coupled together such that rotation of the drive arm about the common drive axis displaces the extension arm along the common drive axis;
- the housing comprising a housing body and a plurality of resiliently deformable holding fingers extending from the housing body and gripping the drive arm therebetween, at least one of the plurality of holding fingers having a camming surface which is urged into engagement by the at least one of the plurality of holding fingers with a camming surface extending at least partially around the drive arm;
- one of the camming surfaces being a groove and the other camming surface being a ridge; and wherein the ridge and the groove are adapted such that two sides of the ridge abut two edges of a mouth of the groove.

27. A linear actuator as claimed in claim 26, wherein the angle between faces of the ridges at the point of abutment is greater than the angle between faces of the groove at the point of abutment.

28. A linear actuator as claimed in claim 26, wherein both the ridge and the groove are V shaped, the ridge angle being wider than the groove angle.

29. A linear actuator as claimed in claim 26, wherein the plurality of holding fingers is further defined as four holding fingers.

30. A linear actuator as claimed in claim 26, wherein the plurality of holding fingers are equally spaced about the common drive axis.

31. A linear actuator as claimed in claim 26, wherein the gripping force applied by the plurality of holding fingers to the drive arm is substantially normal to the common drive axis.

32. A linear actuator as claimed in claim 26, wherein the plurality of holding fingers are adapted to be deformed independently of each other.

* * * * *